K. T. PIHLGREN.
Apparatus for Retouching Photo-Negative Plates.
No. 229,272. Patented June 29, 1880.
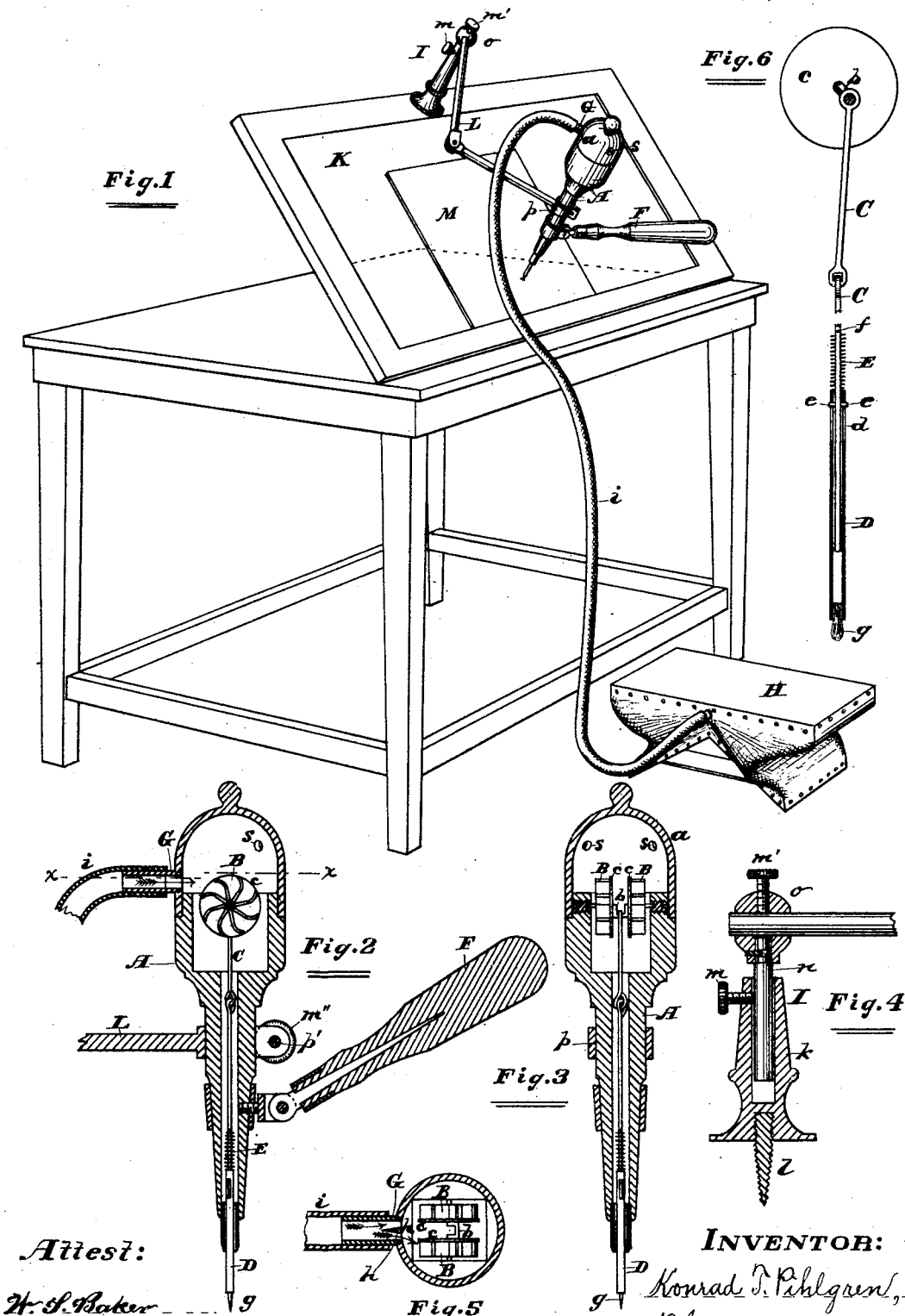

UNITED STATES PATENT OFFICE.

KONRAD T. PIHLGREN, OF CHICAGO, ILL., ASSIGNOR TO WILLIAM P. HUGUNIN AND ALBION P. MARTIN, OF SAME PLACE, ONE-THIRD TO EACH.

APPARATUS FOR RETOUCHING PHOTO-NEGATIVE PLATES.

SPECIFICATION forming part of Letters Patent No. 229,272, dated June 29, 1880.

Application filed January 22, 1880.

*To all whom it may concern:*

Be it known that I, KONRAD T. PIHLGREN, of the city of Chicago, in the county of Cook and State of Illinois, have invented a new and Improved Apparatus for Retouching Photographic Negative-Plates; and I hereby declare the following to be a full, clear, and exact description thereof, reference being had to the accompanying drawings, of which—

Figure 1 is a perspective view of my apparatus; Figs. 2 and 3, enlarged vertical sections of the retouching-pen, taken at right angles with each other; Fig. 4, a vertical section, enlarged, of the adjustable standard, to which the retouching-pen is attached by lazy-tongs; Fig. 5, a cross-section of the pen, taken on the line $x\ x$, Fig. 2; and Fig. 6, a detail view of the stipple portion of the pen.

My invention relates to an apparatus for retouching with a pencil-point, brush, or other suitable marking implement the imperfect spots in photographic negative-plates; and it consists in the part which I designate the "pen," comprising a tubular holder containing a jointed rod with a sliding attachment at its lower end, adapted to hold a pencil or other marking implement, and borne down by a helical spring, and containing also one or more wind-wheels, with attendant mechanism, for communicating to the said rod, by means of compressed air, a rapid longitudinally-reciprocating or stipple motion; and, furthermore, in the mechanism whereby the required stipple motion is imparted by means of compressed air to the rod and its attendant parts, all as hereinafter more fully set forth.

In the drawings, A is the tubular holder of the retouching-pen, with its upper portion enlarged for containing the propelling mechanism, and inclosed at the top by a cap, *a*.

B B are two wind-wheels journaled into the upper part of the holder A, and connected together by means of a crank, *b*, as shown. The inner face of each wheel is covered by a disk, *c*, to confine the air to the flanges or buckets.

I find the device to work most satisfactorily with two wind-wheels, as shown and above described; but one only might be employed, or even more than two, without departing from the spirit of my invention.

C is a jointed rod connected to the crank *b*, and extending nearly to the opposite extremity of the holder A, where it enters the sleeve D. This sleeve is slotted on one or both sides, as shown at *d*, and pins *e* upon the rod C, extending through the said slots, connect the sleeve and rod together and still permit the sleeve to slide upon the rod.

E is a very delicate helical spring surrounding the rod C, and confined between the top of the sleeve D and one or more pins, *f*, upon the rod C. The sleeve is designed to hold a suitable marking substance or implement, *g*.

F is a handle pivoted to the holder A, for the convenience of the operator in holding and guiding the pen.

G is a short pipe, which enters the cap *a* in line with the space between the wind-wheels B, this pipe being divided centrally at its inner end into two passages, as shown in Fig. 5, by means of a short wedge-shaped partition, *h*. One of the passages so formed conveys the air to the right-hand and the other to the left-hand wind-wheel B. The air escapes through one or more openings, *s*, in the opposite side of the cap, whereby there is no back-pressure against the wheels.

The escape of air may be rendered noiseless, if desired, by inclosing the openings *s* with a cap having a single aperture, and a pendent flexible tube leading therefrom.

The propelling power may be simply the breath of the operator forced into the pipe G through a flexible tube having a suitable mouth-piece; but I prefer generally to operate the device in the manner shown—that is to say, by means of the double-acting foot-bellows H and flexible tube *i*—since this mode is less laborious than the other, and besides produces a more uniform blast.

The bellows which I employ and show in the drawings is of my invention, and I believe it to be new; but no claim is herein made to it, as I design to make it the subject of a separate application for a patent.

The pen may, if preferred, be held in the hand of the operator without any mechanical appliance to aid in supporting it; but I find it advantageous, particularly when used by unpracticed persons, to employ the standard I, screwed into the retouching-frame K, and carrying the lazy-tongs L, to which the holder A is connected.

The standard I consists of two parts—viz., the hollow base $k$, provided with the screw $l$ and set-screw $m$, and the rod $n$, sliding within the base $k$, and made adjustable to different altitudes by means of the set-screw $m$, and provided with the revolving head $o$, into which the lazy-tongs L are inserted, and in which they are clamped by means of the set-screw $m'$. The opposite end of the lazy-tongs L is connected to the holder A by means of a collar, $p$, provided with a set-screw, $m''$, whereby the pen may be raised and lowered with respect to the negative-plate M.

To operate my apparatus the negative-plate is placed upon the retouching-frame and the standard I, carrying the lazy-tongs and pen, screwed into the frame, preferably into the top thereof. This renders the pen perpendicular to the plate, and so maintains it. It is highly advisable that the pen be thus held perpendicular to the plate, in order that the point may strike the film squarely and not chafe it. In the hands of a practiced person, however, the mechanical guide may be dispensed with. The pen having been adjusted to the proper level, the wheels B are set in motion by the compressed-air blast, as described, and this, of course, imparts to the marking-point $g$ a rapid stipple motion. The blows struck upon the film are extremely light, owing to the delicacy of the spring E, which must be made to yield almost to the lightest touch. The lazy-tong attachment permits the pen to be easily guided to any desired part of the plate.

The handle F may with advantage be made to unscrew from the collar which connects it to the holder A, and to screw over the point $g$, for the purpose of protecting the latter from injury when the device is carried about in the pocket or otherwise.

What I claim as new, and desire to secure by Letters Patent, is—

1. The combination of the rod C, sliding attachment D at the lower end of the said rod, adapted to hold a marking implement, $g$, spring E, adapted to press the said sliding attachment downward, crank $b$, one or more wind-wheels, B, and holder A, adapted to incase the foregoing parts, and provided with an inlet air-pipe, G, and one or more apertures, $s$, substantially as described.

2. The combination of the holder A, having one or more apertures, $s$, pipe G, divided into two passages at its inner end by means of a partition, $h$, wind-wheels B, journaled to the holder A and provided with the disks $c$ and crank $b$, substantially as described, whereby a stipple motion is imparted, by means of compressed air, to the rod C and its attendant parts, as set forth.

3. The combination of the holder A, having apertures $s$, wind-wheels B, journaled to the holder A, crank $b$, pipe G, flexible tube $i$, and a suitable foot-bellows for imparting, by means of compressed air, a stipple motion to the rod C and attendant parts, substantially as described.

KONRAD T. PIHLGREN.

In presence of—
P. C. DYRENFORTH,
A. P. MARTIN.